US011343658B2

(12) United States Patent
Wang et al.

(10) Patent No.: US 11,343,658 B2
(45) Date of Patent: May 24, 2022

(54) METHOD AND DEVICE FOR DETERMINING TRANSMISSION MODE, STORAGE MEDIUM AND ELECTRONIC DEVICE

(71) Applicant: ZTE CORPORATION, Guangdong (CN)

(72) Inventors: Mengzhen Wang, Shenzhen (CN); Lin Chen, Shenzhen (CN); Youxiong Lu, Shenzhen (CN)

(73) Assignee: ZTE Corporation, Shenzhen (CN)

(*) Notice: Subject to any disclaimer, the term of this patent is extended or adjusted under 35 U.S.C. 154(b) by 0 days.

(21) Appl. No.: 16/911,232

(22) Filed: Jun. 24, 2020

(65) Prior Publication Data

US 2020/0329352 A1 Oct. 15, 2020

Related U.S. Application Data

(63) Continuation of application No. PCT/CN2018/124219, filed on Dec. 27, 2018.

(30) Foreign Application Priority Data

Feb. 12, 2018 (CN) .......................... 201810147324.6

(51) Int. Cl.
*H04W 4/40* (2018.01)
*H04L 1/00* (2006.01)
(Continued)

(52) U.S. Cl.
CPC ............. *H04W 4/40* (2018.02); *H04L 1/0003* (2013.01); *H04L 1/0006* (2013.01);
(Continued)

(58) Field of Classification Search
CPC ......... H04W 4/40; H04W 8/24; H04W 92/18; H04W 4/46; H04L 1/0003; H04L 1/0006;
(Continued)

(56) References Cited

U.S. PATENT DOCUMENTS 8,036,154 B2 * 10/2011 Jung .................. H04N 21/4345
370/311
2018/0376304 A1* 12/2018 Cheng ..................... H04W 4/44
2018/0376308 A1* 12/2018 Xiao ....................... H04L 69/14

FOREIGN PATENT DOCUMENTS

CN  101052126 A  10/2007
CN  101557645 A  10/2009
(Continued)

OTHER PUBLICATIONS

Schlienz et al. (Device to Device communication in LTE, Whitepaper; D2D communication 1MA264_0e (Year: 2015).*

(Continued)

*Primary Examiner* — Hirdepal Singh
(74) *Attorney, Agent, or Firm* — Foley & Lardner LLP

(57) ABSTRACT

Provided are a method and device for determining a transmission mode, a storage medium and an electronic device. The method includes acquiring information for determining the transmission mode, where the information includes at least one of: service profile information about a first service from an upper layer of a first terminal or an application layer of the first terminal, access layer information about the first terminal, transmission parameter information configured for the first terminal by a base station, or capability information about a second terminal of a proximity service; and determining the transmission mode according to the information. This can solve the problem in the existing art of how to perform communication better when there are UEs of different types or different capabilities in a system.

18 Claims, 4 Drawing Sheets

(51) Int. Cl.
*H04W 8/24* (2009.01)
*H04W 92/18* (2009.01)

(52) U.S. Cl.
CPC .......... *H04L 1/0009* (2013.01); *H04L 1/0035* (2013.01); *H04W 8/24* (2013.01); *H04W 92/18* (2013.01)

(58) Field of Classification Search
CPC ..... H04L 1/0009; H04L 1/0035; H04L 67/12; H04L 67/303; H04L 1/00; H04L 67/16; H04L 67/30
USPC .......................................................... 455/403
See application file for complete search history.

(56) References Cited

FOREIGN PATENT DOCUMENTS

| | | | |
|---|---|---|---|
| CN | 102137334 A | 7/2011 | |
| CN | 104113833 A | 10/2014 | |
| CN | 105050194 A | 11/2015 | |
| CN | 105703874 A | 6/2016 | |
| CN | 106658352 A | 5/2017 | |
| KR | 20060042907 A | 2/2012 | |
| KR | 20170036623 A | 4/2017 | |
| WO | WO-2017/147904 A1 | 9/2017 | |
| WO | WO-2018/236635 A1 | 12/2018 | |

OTHER PUBLICATIONS

Extended European Search Report for EP Appl. No. 18905271.5, dated Oct. 9, 2020. (11 pages).
First Office Action for CN Appl. No. CN 201810147324.6 dated Dec. 31, 2020 (with English Translation, 14 pages).
J Schlienz et al.: "Device to Device Communication in LTE" Whitepaper D2D Communication-1MA264 0E; Sep. 29, 2015 (Sep. 29, 2015), (36 pages).
3rd Generation Partnership Project: Evolved Universal Terrestrial Radio Access Radio Resource Control; 3GPP TS 36.331; V14.4.0; Sep. 25, 2017 (753 pages).
3rd Generation Partnership Project: "User equipment (UE) to V2X control function" 3GPP TS 24.386; V14.3.0; Stage 3; Technical specification group core network and terminals; Dec. 28, 2017 (35 pages).
First KR Office Action on KR 10-2020-7021083 dated Apr. 13, 2021 (6 pages).
International Search Report for International Appl. No. PCT/CN2018/124219, dated Mar. 14, 2019. (5 Pages with English translation).
First Office Action for JP Appl. No. 2020-540569, dated Aug. 27, 2021 (with English translation, 15 pages).
Qualcomm Incorporated: "Coexistence between Rel-14 and Rel-15 V2X UEs" 3GPP TSG RAN WG2 Meeting #100; R2-1713407; Dec. 1, 2017; Reno, USA (5 pages).
Samsung: "Hugh order modulation in V2X" 3GPP TSG RAN WG1 Meeting #91; R1-1720252; Dec. 1, 2017; Reno, USA (4 pages).
Second Office Action for CN Appl. No. 201810147324.6, dated Jul. 22, 2021 (with English translation, 15 pages).
ZTE: "Discussion on support of 64QAM over sidelink" 3GPP TSG-RAN WG2 Meeting #100; R2-1713080; Dec. 1, 2017; Reno, USA (5 pages).
Extended European Search Report for EP Appl. No. 18905271.5, dated Apr. 4, 2022 (10 pages).
Second Office Action on JP 2020-540569 dated Apr. 8, 2022 (6 pages, including English translation).
ZTE, "Discussion on Carrier Selection in PC5 CA", 3GPP TSG-RAN WG2 Meeting #100 R2-1713070, Nov. 17, 2017 (7 pages).

\* cited by examiner

METHOD AND DEVICE FOR DETERMINING TRANSMISSION MODE, STORAGE MEDIUM AND ELECTRONIC DEVICE

CROSS-REFERENCE TO RELATED APPLICATIONS

This application claims the benefit of priority under 35 U.S.C. § 120 as a continuation of PCT Patent Application No. PCT/CN2018/124219, filed on Dec. 27, 2018, which claims priority to Chinese patent application no. 201810147324.6, filed on Feb. 12, 2018, the disclosure of each of which is incorporated herein by reference in its entirety.

TECHNICAL FIELD

This disclosure relates to the field of communications and, in particular, to a method and device for determining a transmission method, a storage medium and an electronic device.

BACKGROUND

The Internet of vehicles refers to a large system network for wireless communication and information exchange between a vehicle and X (X: a vehicle, a pedestrian, an infrastructure or the Internet) according to agreed communication protocols and data interaction standards. Through the communication of the Internet of vehicles the driving safety of vehicles can be realized, the traffic efficiency can be improved, and vehicles can be provided with convenience or entertainment information. According to objects of wireless communications, there are three different types of communications of the Internet of vehicles: a vehicle-to-vehicle (V2V) communication, a vehicle-to-infrastructure/vehicle-to-network (V2I/V2N) communication and a vehicle-to-pedestrian (V2P) communication, which are collectively referred to as a vehicle-to-everything (V2X) communication.

In researches of the V2X communication based on long term evolution (LTE) of the 3rd Generation Partnership Project (3GPP) organization, a V2X communication method based on a direct link/sidelink between user equipments (UEs) is one way to implement V2X standards, that is, service data is directly transmitted from a source user equipment to a target user equipment through an air interface without being forwarded by a base station and a core network. FIG. 1 is a schematic diagram of a V2X direct/sidelink communication according to the existing art. As shown in FIG. 1, this V2X communication mode is simply referred to as the PC5-based V2X communication or V2X sidelink communication.

With developments of technologies and automation industry, scenarios of the V2X communication have been further extended and have higher performance requirements. The researches of the 3GPP in the second stage (R15 V2X) further extend and complement R14 V2X, which are backward compatible with R14 V2X communications to support V2X services having higher performance requirements. An R15 V2X UE and an R14 V2X UE may coexist in a same resource pool and further support performances, such as a PC5 carrier aggregation, 64 QAM, transmit diversity and so on. When there are R14 V2X UEs and R15 V2X UEs in a system at the same time, or UEs in the system have capability differences, it is necessary to consider how to perform V2X sidelink communications more effectively.

No effective solution has yet been proposed for the above problem.

SUMMARY

Embodiments of the present disclosure provide a method and device for determining a transmission method, a storage medium and an electronic device to solve the problem in the existing art of how to better perform communications when there are UEs of different types or different capabilities in a system.

A method for determining a transmission mode is provided according to an embodiment of the present disclosure, and the method includes steps described below. Information for determining the transmission mode is acquired, where the information includes at least one of: service profile information about a first service from an upper layer of a first terminal or an application layer of the first terminal, access layer information about the first terminal, transmission parameter information configured for the first terminal by a base station, or capability information about a second terminal of a proximity service; and the transmission mode is determined according to the information.

A device for determining a transmission mode is provided according to another embodiment of the present disclosure, and the device includes an acquisition module and a determination module. The acquisition module is configured to acquire information for determining the transmission mode, where the information includes at least one of: service profile information about a first service from an upper layer of a first terminal or an application layer of the first terminal, access layer information about the first terminal, transmission parameter information configured for the first terminal by a base station, or capability information about a second terminal of a proximity service. The determination module is configured to determine the transmission mode according to the information.

A storage medium is further provided according to another embodiment of the present disclosure, the storage medium stores a computer program. When the computer program is executed, the computer program is configured to implement any one of the steps in the method embodiments described above.

An electronic device is further provided according to another embodiment of the present disclosure. The electronic device includes a memory and a processor. The memory is configured to store a computer program. The processor is configured to execute the computer program to perform any one of the steps in the method embodiments described above.

Through the embodiments of the present disclosure, since at least one of the service profile information about the first service from the upper layer of the first terminal or the application layer of the first terminal, the access layer information about the first terminal, the transmission parameter information configured for the first terminal by the base station, or the capability information about the second terminal of the proximity service is acquired, and the transmission mode is determined on the basis of these information, in this way, when there are UEs of different types or different capabilities in the system, the transmission mode can be determined on the basis of the acquired information, so that the determined transmission mode can be adapted to the receiving terminal, thereby improving the communication performance. Therefore, the problem in the existing art of how to perform communication better when there are UEs of different types or different capabilities in the system can be solved.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure, and do not form improper limits to the present disclosure. In the drawings.

DETAILED DESCRIPTION

Hereinafter the present disclosure will be described in detail with reference to the drawings in conjunction with the embodiments. It is to be noted that if not in collision, the embodiments and features therein in the present application may be combined with each other.

It is to be noted that the terms "first", "second" and the like in the description, claims and drawings of the present disclosure are used to distinguish between similar objects and are not necessarily used to describe a particular order or sequence.

Embodiment One

Figure 1:
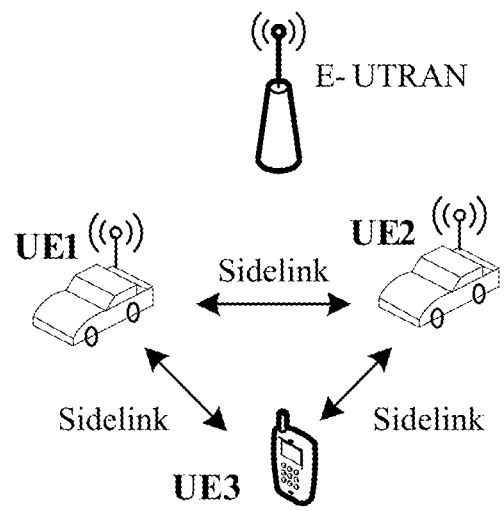
FIG. 1 is a schematic diagram of a V2X direct/sidelink communication according to the existing art.
Figure 2:
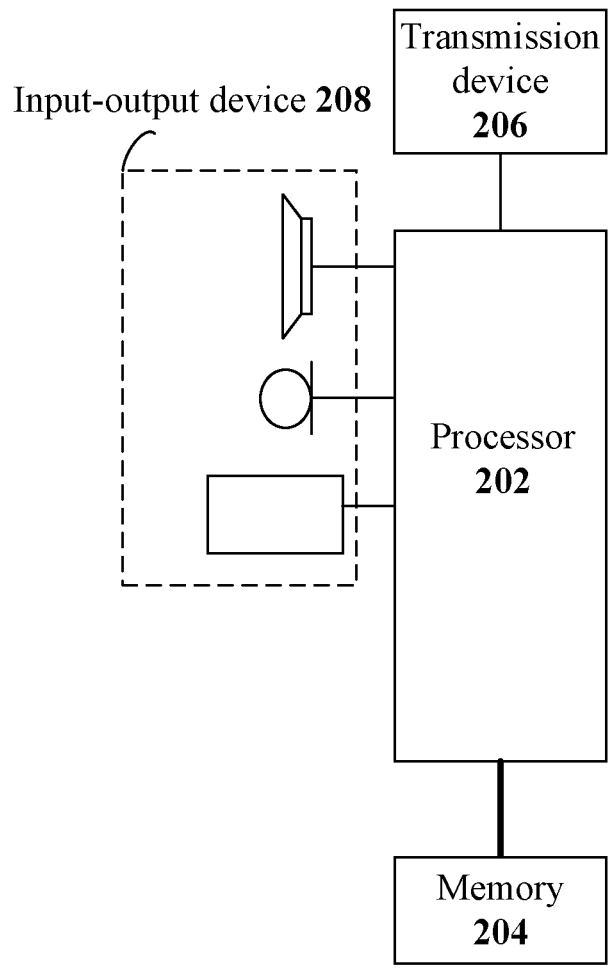
FIG. 2 is a hardware structural block diagram of a mobile terminal for a method for determining a transmission mode according to an embodiment of the present disclosure.

The method embodiment provided by embodiment one of the present application may be executed on a mobile terminal, a computer terminal or other similar computing apparatuses. Taking the method executed on the mobile terminal as an example, FIG. 2 is a hardware structural block diagram of a mobile terminal for a method for determining a transmission mode according to an embodiment of the present disclosure. As shown in FIG. 2, the mobile terminal 20 may include one or more (only one is shown in FIG. 2) processors 202 (each processor 202 may include, but is not limited to, a microcontroller unit (MCU), a field programmable gate array (FPGA) or other processing apparatuses), and a memory 204 configured to store data. Optionally, the mobile terminal may further include an input-output device 208 and a transmission device 206 for a communication function. It may be understood by those skilled in the art that the structure shown in FIG. 2 is merely illustrative and not intended to limit the structure of the mobile terminal. For example, the mobile terminal 20 may further include more or fewer components than the components shown in FIG. 2, or may have a different configuration as the configuration shown in FIG. 2.

The memory 204 may be configured to store a computer program, such as a software program and a module of application software, for example, a computer program corresponding to the method for determining a transmission mode in the embodiments of the present disclosure. The processor 202 executes a software program stored in the memory 204 to perform various functional applications and data processing, that is, to implement the preceding method. The memory 204 may include a high-speed random access memory, or may further include a nonvolatile memory such as one or more magnetic storage apparatuses, flash memories or other nonvolatile solid-state memories. In some examples, the memory 204 may further include memories that are remotely disposed with respect to the processor 202. These remote memories may be connected to the mobile terminal 20 via a network. Examples of the network include, but are not limited to, the Internet, an intranet, a local area network, a mobile communication network and combinations thereof.

The transmission device 206 is configured to receive or transmit data via a network. Specific examples of the above network may include a wireless network provided by a communication provider of the mobile terminal 20. In an example, the transmission device 206 includes a network interface controller (NIC), which may be connected to other network devices through a base station, thereby communicating with the Internet. In an example, the transmission device 206 may be a radio frequency (RF) module, which is configured to communicate with the Internet in a wireless manner.

Figure 3:
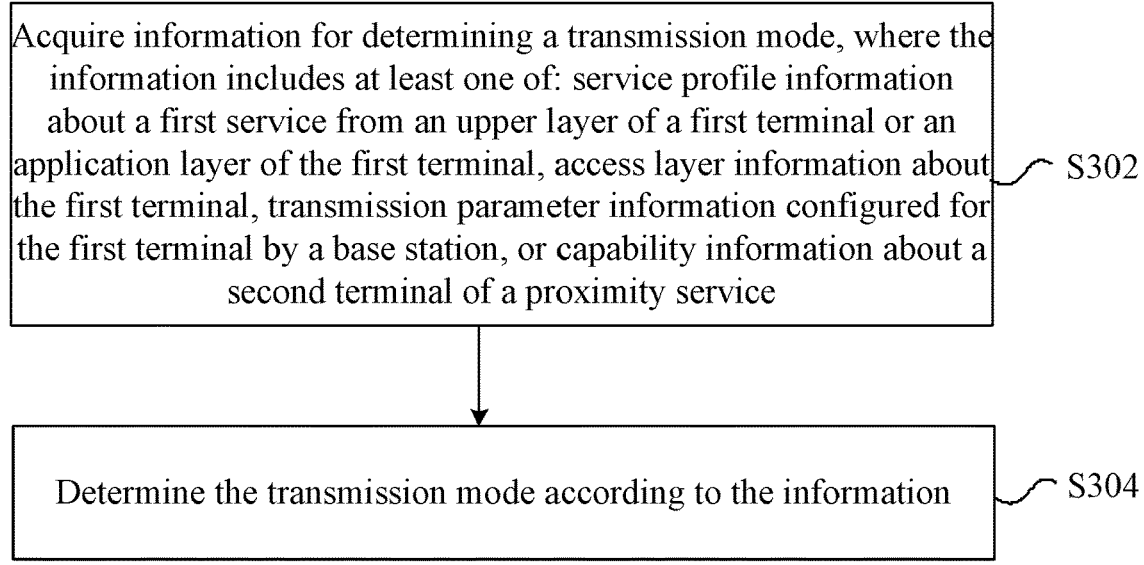
FIG. 3 is a flowchart of a method for determining a transmission mode according to an embodiment of the present disclosure.

This embodiment provides the method for determining a transmission mode executed on the mobile terminal. The method may, but not necessarily, be applied to the vehicle-to-everything (V2X) communication, a device-to-device (D2D) communication, or other systems with equipment-to-equipment direct communications. FIG. 3 is a flowchart of a method for determining a transmission mode according to an embodiment of the present disclosure. As shown in FIG. 3, the process includes steps described below.

In step S302, information for determining the transmission mode is acquired. The information includes at least one of: service profile information about first service from an upper layer of a first terminal or an application layer of the first terminal, access layer information about the first terminal, transmission parameter information configured for the first terminal by a base station, or capability information about a second terminal of a proximity service.

In step S304, the transmission mode is determined according to the information.

Through the preceding steps, since at least one of the service profile information about the first service from the upper layer of the first terminal or the application layer of the first terminal, the access layer information about the first terminal, the transmission parameter information configured for the first terminal by the base station, or the capability information about the second terminal of the proximity service is acquired, and the transmission mode is determined on the basis of these pieces of information, in this way, when there are UEs of different types or different capabilities in the system, the transmission mode can be determined on the basis of the acquired information, so that the determined transmission mode can be adapted to the receiving terminal, thereby improving the communication performance. Therefore, the problem in the existing art of how to perform better communications when there are UEs of different types or different capabilities in the system can be solved.

It should be noted that the second terminal of the proximity service may be, but is not limited to, at least one of: a terminal within a transmission range of the first terminal, a terminal which has a distance from the first terminal less than a predetermined threshold, or a device on the opposite side of the first terminal.

It should be noted that the service profile information may, but not necessarily, include at least one of: protocol version information or transmission format information. Taking the method applied to the V2X communication as an example, the protocol version information may include an R14 protocol or an R15 protocol, and the transmission format information may include an R14 format or an R15 format, which are not limited thereto.

It should be noted that the access layer information includes at least one of resource usage, a channel busy ratio, a resource collision probability or channel quality. It should be noted that the resource usage may be resource usage of resources in a resource pool which are preconfigured or requested by the first terminal, and the resource collision probability may be a collision probability between resources used by terminals of different types in a same resource pool, which are not limited thereto.

It should be noted that the capability information about the second terminal may, but not necessarily, include at least one of: whether the second terminal supports quadrature amplitude modulation (64 QAM), whether the second terminal supports transmit diversity, whether the second terminal supports direct link interface (PC5) data duplication, whether the second terminal supports PC5 data split, or information about a transmission format supported by the second terminal.

In an embodiment of the present disclosure, the step 302 in which the service profile information about the first service is acquired may be represented as receiving indication information delivered by the upper layer of the first terminal or the application layer of the first terminal, where the indication information carries the service profile information about the first service.

It should be noted that before the step of receiving the indication information delivered by the upper layer of the first terminal or the application layer of the first terminal, the method further includes steps described below. The upper layer of the first terminal or the application layer of the first terminal acquires a mapping relation between a service type of a service and service profile information about the service, and the service profile information about the first service is determined according to a service type of the first service and the mapping. The mapping relation includes at least one piece of service profile information corresponding to each service type, or at least one service type corresponding to each piece of service profile information.

It should be noted that the service profile information may include at least one of: the protocol version information or the transmission format information, the mapping relation between the service type of the service and the service profile information about the service may be represented by at least one of a mapping relation between the service type of the service and the protocol version information about the service, or a mapping relation between the service type of the service and the transmission format information about the service.

It should be noted that the upper layer of the first terminal or the application layer of the first terminal acquires the mapping relation in at least one of following manners: acquiring through a mode of pre-configuring the mapping relation, acquiring through an Internet of vehicles control function entity, or acquiring through a proximity-service control function entity.

It should be noted that the transmission mode includes at least one of: a transmission format used for transmitting the first service, a modulation and coding scheme used for transmitting the first service, transmit diversity used for transmitting the first service, a mode of using the PC5 data duplication for transmitting the first service, or a mode of using the direct link interface (PC5) data split for transmitting the first service.

It should be noted that the direct link interface may, but not necessarily, be referred to as an interface between UEs, or referred to as a sidelink.

In an embodiment of the present disclosure, when the information includes the transmission parameter information configured for the first terminal by the base station, before the step S302, the method may further includes a step described below. At least one of capability information about the first terminal, the service type of the first service, or the protocol version information about the first service is reported to the base station.

It should be noted that the capability information about the first terminal includes at least one of: whether the first terminal supports the quadrature amplitude modulation (64 QAM), whether the first terminal supports the transmit diversity, whether the first terminal supports the PC5 data duplication, whether the first terminal supports the PC5 data split, or information about a transmission format supported by the first terminal.

It should be noted that at least one of the service type of the first service or the protocol version information about the first service is reported to the base station in at least one of following manners: carrying at least one of the service type of the first service or the protocol version information about the first service through user equipment assistance information, carrying at least one of the service type of the first service or the protocol version information about the first service through sidelink user equipment information, carrying at least one of the service type of the first service or the protocol version information about the first service through a sidelink buffer size report, or carrying at least one of the service type of the first service/or the protocol version information about the first service through a defined media access control control element (MAC CE) on a sidelink.

It should be noted that the above-mentioned MAC CE may be, but not necessarily, different from an MAC CE in the existing art, or be an extended MAC CE based on the MAC CE in the existing art, or be a newly defined MAC CE.

It should be noted that the MAC CE includes a bitmap. Where, at least one of the service type of the first service or the protocol version information about the first service is indicated through at least one bit of the bitmap. For example, one bit in the bitmap is used to indicate at least one of the service type of the first service or the protocol version information about the first service. When one bit has a first value, the one bit is used to indicate that the service type of the first service is a first type and/or the protocol version information is first version information (for example, version R14); when the one bit has a second value, the one bit is used to indicate that the service type of the first service is a second type and/or the protocol version information is second version information (for example, version R15), which is not limited thereto. When multiple bits are used for indication, at least one of the service type of the first service or the protocol version information about the first service is determined through different values of the multiple bits. It should be noted that when the multiple bits are used for indication, there may be multiple status values. If the multiple status values still have unused values after indicating the service type of the first service and/or the protocol version information, then these unused status values may be reserved values. For example, two bits are used to indicate the protocol version information, then there are four states (00, 01, 10 and 11), but there are two protocol versions (version R14 and version R15). Thus, 00 is used to indicate version R14, 01 is used to indicate version R15, and both unused states 10 and 11 may be reserved values.

In an embodiment of the present disclosure, after the step S304, the method may further include a step described below. Protocol version information about a transmitted service or transmission format information about the transmitted service is indicated in transmitted sidelink control information, where the protocol version information or the transmission format information is placed at $1^{st}$ bit to $N^{th}$ bit of the sidelink control information or a reserved bit of the sidelink control information, and N is an integer greater than or equal to 1.

In an embodiment of the present disclosure, the capability information about the second terminal of the proximity service is acquired in at least one of following manners: the capability information about the second terminal transmitted by the second terminal through first sidelink broadcast signaling is received, the capability information about the second terminal transmitted by the second terminal through first sidelink unicast signaling is received, or the capability information about the second terminal transmitted by the second terminal through a defined MAC CE on a sidelink is received.

It should be noted that before the step of receiving the capability information about the second terminal, the method further includes a step described below. A request message configured to request the capability information about the second terminal is transmitted to the second terminal through second sidelink broadcast signaling, or a request message configured to request the capability information about the second terminal is transmitted to the second terminal through second sidelink unicast signaling.

It should be noted that the step of receiving the capability information about the second terminal may be implemented through sidelink broadcast signaling or sidelink unicast signaling to receive the capability information about the second terminal, but it is not limited thereto.

Optionally, the preceding step may be, but not necessarily, performed by the terminal shown in FIG. 2, or by the first terminal in the present embodiment.

To better understand the embodiments of the present disclosure, the present disclosure will be further described below in conjunction with alternative embodiments.

An alternative embodiment of the present disclosure provides a method for determining a transmission mode. The method includes determining the transmission mode through a service profile and/or access layer information of a service transmitted by a terminal and may specifically take the form described below.

A transmission format is selected with regard to an profile of the transmitted service. If the transmitted service needs to be received by an R14 UE or the transmitted service has an R14 V2X service type, then an R14 transmission format is used. If the transmitted service does not need to be received by an R14 UE or the transmitted service has a service type supported only by R15 V2X, then an R15 transmission format is used. The specific transmission mode may be further determined according to other requirement information, capability information or access layer information, such as a modulation coding scheme, transmit diversity, PC5 data duplication, PC5 data split and etc.

A mapping relation between a V2X service type and protocol version information (such as R14 and R15) preconfigured for a UE or configured by a V2X control function entity may have multiple forms, such as 1) for each service type/destination ID (V2X service type/V2X communication destination), whether R14 and/or R15 are/is supported is indicated; or 2) service type lists/destination ID lists supported by R14 and R15 are provided.

When the UE receives V2X data from an upper layer, the upper layer further provides or indicates protocol version information or transmission format information (such as the R14 format, the R15 format, and etc.) corresponding to a service type of the V2X data. That is, it is indicated the data has the R14 V2X service type or the R15 V2X service type.

A UE access layer determines the specific transmission mode according to the protocol version information or the transmission format information, and other information (access layer information) provided by the upper layer. Examples are described as below.

For a selection of a modulation order (a modulation and coding scheme index (MCS)), the other information may be a transmission range, a data rate, a UE relative speed, channel quality and the like. If the upper layer indicates that the transmitted data has the R14/R15 V2X service type or indicates to use the R14/R15 transmission format, then the UE further selects the modulation order (MCS) for transmission according to the transmission range, the data rate, the UE relative speed, the channel quality and other information.

For a selection of the transmit diversity, the other information may be resource usage, a resource collision probability, a congestion condition, a channel busy ratio and the like. For example, if the upper layer indicates that the transmitted data has the R14 V2X service type or indicates to use the R14 transmission format, then the UE does not use the transmit diversity; if the upper layer indicates that the transmitted data has the R15 V2X service type or indicates to use the R15 transmission format, and there are fewer resource collisions and a lower channel busy ratio, then the UE may select to use the transmit diversity.

For the PC5 data duplication or the PC5 data split, the other information may be reliability requirements, data rate requirements, a service quality grade identification, the congestion condition, the channel busy ratio and the like. For example, if the upper layer indicates that the transmitted data has the R15 V2X service type or indicates to use the R15 transmission format, and there are higher reliability requirements and a better congestion condition, then the UE may select to use the PC5 data duplication for transmission to improve the transmission reliability; if there are higher data rate requirements, the UE may select to use the PC5 data split to improve the data transmission rate.

An alternative embodiment of the disclosure further provides another method for determining a transmission mode. The method includes determining the transmission mode in the manner of configuring the transmission mode for a terminal through a base station. The method specifically takes the form described below.

For the case where the base station schedules resources, in order to assist an eNB to perform an appropriate transmitting configuration (such as a modulation and coding scheme (MCS) configuration, a transmit diversity configuration, a PC5 data duplication and/or PC5 data split configuration), a UE reports capability information of itself and provides a service type and/or protocol version information to the eNB.

The capability information reported by the UE includes at least one of: whether to support 64 QAM, whether to support the transmit diversity, whether to support the PC5 data duplication, whether to support the PC5 data split, or whether to support the R15 transmission format.

The step in which the service type and/or the protocol version information are/is provided to the eNB includes at least one of steps described below.

The service type and/or the protocol version information are/is reported through UE assistance information. The UE assistance information includes at least one of the service type or the protocol version information.

The service type and/or the protocol version information are/is provided through a sidelinkUEInformation message. When requesting a transmitting resource, the current sidelinkUEInformation message contains a V2X communication destination (corresponding to the service type) list in transmit frequency point information, so corresponding version information of each V2X communication destination may be further contained.

The service type and/or the protocol version information are/is provided through a sidelink buffer size report (BSR). When reporting the sidelink BSR, the sidelink BSR may contain index information about the V2X communication destination (corresponding to an index value of the V2X communication destination in the sidelinkUEInformation message), the eNB may know frequency point information about the requested resource according to the V2X communication destination index and the V2X communication destination list in the sidelinkUEInformation message, then, the protocol version information corresponding to the V2X communication destination (that is, the service type) corresponding to the V2X communication destination index may further be contained in the sidelink BSR.

The service type and/or the protocol version information are/is provided through a new MAC CE, for example, a newly defined MAC CE, which contains at least one byte of bitmap information. Each bit is in one-to-one correspondence with the protocol version information corresponding to the V2X communication destination (that is, the service type) corresponding to the V2X communication destination index in the sidelink BSR, such as 1 indicates R15, while 0 indicates R14. Alternatively, every 2 bits are in correspondence with the protocol version information corresponding to the V2X communication destination (that is, the service type) corresponding to the V2X communication destination index in the sidelink BSR, such as 00 indicates R14, 01 indicates R15, and others are reserved values. The unused bits are set as 0.

A mapping relation between the V2X service type and the protocol version information or a mapping relation between the V2X communication destination and the protocol version information is pre-configured for the eNB. The eNB obtains the corresponding protocol version information according to the mapping relation in conjunction with the service type information in the UE assistance information, or in conjunction with the V2X communication destination in the sidelinkUEInformation message, or in conjunction with the V2X communication destination index in the sidelink BSR. The pre-configuration for the eNB may be an operation administration and maintenance (OAM) configuration or performed by a V2X control function entity via a home subscriber server (HSS) and mobility management entity (MME).

It should be noted that a transmitting terminal may further indicate the protocol version information or the transmission format information in sidelink control information (SCI). For example, one bit is used for indication, where 1 indicates the R15/the R15 format, while 0 indicates the R14/the R14 format; or two bits are used for indication, where 00 indicates the R14/the R14 format, 01 indicates the R15/the R15 format, and others are reserved values. The indication information may be placed at a front part of the SCI or at a reserved bit. Then, after a receiving UE receives SCI sent by other UEs, if decoded version information or transmission format information indicated in the SCI is higher than a version or a transmission format or a capability of the receiving UE, then the receiving UE no longer decodes other contents of the SCI or no longer decodes/receives sidelink data transmitted by indication resources in the SCI, thus saving overheads. If the decoded version information or transmission format information indicated in the SCI is not higher than the version or the transmission format or the capability of the receiving UE, then the receiving UE further decodes other contents of the SCI and or continues decodes/receives the sidelink data transmitted by the indication resources in the SCI.

Figure 4:
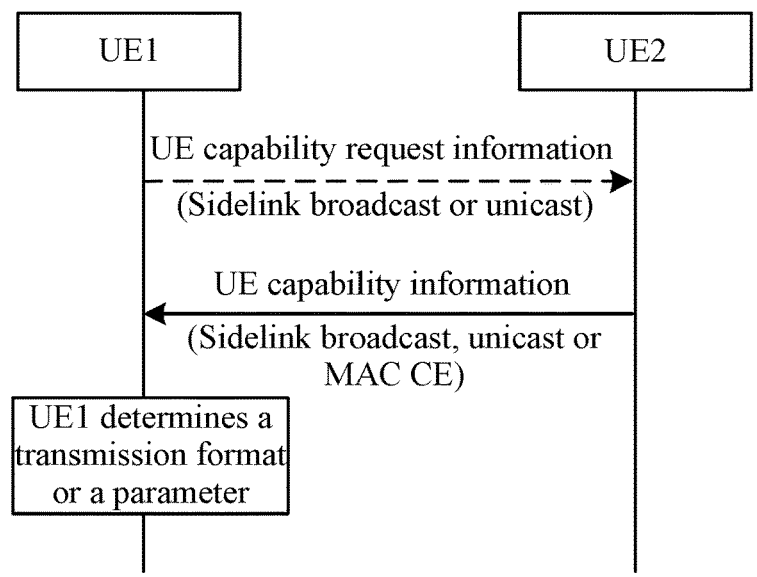
FIG. 4 is a flowchart of a method for determining a transmission mode according to an alternative embodiment of the present disclosure.

An alternative embodiment of the present disclosure further provides another method for determining a transmission mode. The method includes determining the transmission mode through a capability of a surrounding UE or a UE on the opposite end. FIG. 4 is a flowchart of a method for determining a transmission mode according to an alternative embodiment of the present disclosure. As shown in FIG. 4, a capability negotiation is required between UEs. Specifically, a transmitting UE (equivalent to the first terminal) acquires the capability of the surrounding UE or the UE on the opposite end (equivalent to the second terminal of the proximity service), and determines the transmission mode and specific transmission parameters according to the capability information of the surrounding UE or the UE on the opposite end, a transmit service profile and other information.

It should be noted that the step in which the transmitting UE acquires the capability of the surrounding UE or the UE on the opposite end includes steps described below.

For a V2X sidelink broadcast communication, the transmitting UE transmits UE capability request information through sidelink broadcast signaling (optional), and proximal UEs receiving the information transmit UE capability information of themselves through sidelink broadcast signaling. Alternatively, a UE periodically broadcasts UE capability information of itself through sidelink broadcast signaling, and the transmitting UE receives the UE capability information transmitted by nearby UEs through the sidelink broadcast signaling.

If V2X sidelink unicast signaling is supported, the transmitting UE transmits the UE capability request information through the sidelink broadcast signaling (optional), proximal UEs receiving the information transmits UE capability information of themselves to the transmitting UE through the sidelink unicast signaling, and the transmitting UE receives the UE capability information transmitted by the proximal UEs through the sidelink unicast signaling.

For a V2X sidelink unicast communication, the transmitting UE transmits UE capability request information to the UE on the opposite side through sidelink unicast signaling (optional), and the UE on the opposite side returns UE capability information of itself through the sidelink unicast signaling.

A UE transmits UE capability information of itself through a sidelink MAC CE, for example, a newly defined MAC CE that may contain the UE capability information.

It should be noted that the UE capability information includes at least one of: whether to support the 64 QAM, whether to support the transmit diversity, whether to support the PC5 data duplication, whether to support PC5 the data split, or whether to support the R15 transmission format.

From the description of the above embodiments, it will be apparent to those skilled in the art that the methods in the embodiments described above may be implemented by software plus a necessary general-purpose hardware platform, or may of course be implemented by hardware. However, in many cases, the former is an alternative implementation manner. Based on this understanding, the technical solutions of the present disclosure substantially, or the part contributing to the existing art, may be embodied in the form of a software product. The computer software product is stored in a storage medium (such as a read-only memory (ROM)/a random access memory (RAM), a magnetic disk or an optical disk) and includes several instructions for enabling a terminal device (which may be a mobile phone, a computer, a server, a network device or the like) to perform the method according to each embodiment of the present disclosure.

Embodiment Two

This embodiment further provides a device for determining a transmission mode. The device is configured to implement the above embodiments and alternative embodiments. What has been described will not be repeated here. As used below, the term "module" may be software, hardware or a combination thereof capable of implementing predetermined functions. The device in the embodiment described below is preferably implemented by software, but implementation by hardware or by a combination of software and hardware is also possible and conceivable.

Figure 5:
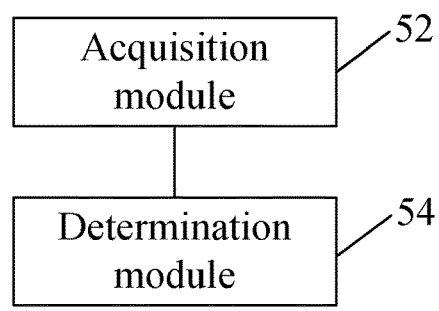
FIG. 5 is a structural block diagram of a device for determining a transmission mode according to an embodiment of the present disclosure.

FIG. 5 is a structural block diagram of a device for determining a transmission mode according to an embodiment of the present disclosure. As shown in FIG. 5, the device includes an acquisition module 52 and a determination module 54.

The acquisition module 52 is configured to acquire information for determining the transmission mode. The information includes at least one of: service profile information about a first service from an upper layer of a first terminal or an application layer of the first terminal, access layer information about the first terminal, transmission parameter information configured for the first terminal by a base station, or capability information about a second terminal of a proximity service.

The determination module 54 is connected to the acquisition module 52, and the determination module 54 is configured to determine the transmission mode according to the information.

Through the preceding device, at least one of the service profile information about the first service from the upper layer of the first terminal or the application layer of the first terminal, the access layer information about the first terminal, the transmission parameter information configured for the first terminal by the base station, or the capability information about the second terminal of the proximity service is acquired, and the transmission mode is determined on the basis of these pieces of information. In this way, when there are UEs of different types or different capabilities in a system, the transmission mode can be determined on the basis of the acquired information, so that the determined transmission mode can be adapted to a receiving terminal, thereby improving the communication performance. Therefore, this can solve the problem in the existing art of how to perform a better communication when there are UEs of different types or different capabilities in the system.

It should be noted that the second terminal of the proximity service may be, but is not limited to, at least one of: a terminal within a transmission range of the first terminal, a terminal which has a distance less than a predetermined threshold from the first terminal, or an opposite device of the first terminal.

It should be noted that the service profile information may, but not necessarily, include at least one of: protocol version information or transmission format information. Taking the method applied to a V2X communication as an example, the protocol version information may include an R14 protocol or an R15 protocol, and the transmission format information may include an R14 format or an R15 format, which are not limited thereto.

It should be noted that the access layer information may, but not necessarily, include at least one of resource usage, a channel busy ratio, a resource collision probability or channel quality. It should be noted that the resource usage may be resource usage of a resource pool of resources that the first terminal request to use or pre-use, and the resource collision probability may be a collision probability between resources used by terminals of different types in a same resource pool, which are not limited thereto.

It should be noted that the capability information about the second terminal may, but not necessarily, include at least one of: whether the second terminal supports quadrature amplitude modulation (64 QAM), whether the second terminal supports transmit diversity, whether the second terminal supports direct link interface (PC5) data duplication, whether the second terminal supports PC5 data split, or information about a transmission format supported by the second terminal.

In an embodiment of the present disclosure, the acquisition module 52 is further configured to receive indication information delivered by the upper layer of the first terminal or the application layer of the first terminal. The indication information carries the service profile information about the first service.

It should be noted that the device further includes that the upper layer of the first terminal or the application layer of the first terminal acquires a mapping relation between a service type of a service and service profile information about the service, and the service profile information about the first service is determined according to a service type of the first service and the mapping relation, where, the mapping relation includes at least one piece of service profile information corresponding to each service type, or at least one service type corresponding to each piece of service profile information.

It should be noted that since the service profile information may include at least one of: the protocol version information or the transmission format information, the mapping relation between the service type of the service and the service profile information about the service may be at least one of a mapping relation between the service type of the service and the protocol version information about the service, or a mapping relation between the service type of the service and the transmission format information about the service.

It should be noted that the upper layer of the first terminal or the application layer of the first terminal acquires the mapping relation in at least one of following manners: acquiring through a mode of pre-configuring the mapping relation, acquiring through an Internet of vehicles control function entity, or acquiring through a proximity-service control function entity.

It should be noted that the proximity-service control function entity may be a control function entity within a transmission range of the first terminal.

It should be noted that the transmission mode includes at least one of: a transmission format used for transmitting the first service, a modulation and coding scheme used for transmitting the first service, transmit diversity used for transmitting the first service, a mode of using the PC5 data duplication for transmitting the first service, or a mode of using the direct link interface (PC5) data split for transmitting the first service.

In an embodiment of the present disclosure, if the information includes the transmission parameter information configured for the first terminal by the base station, the device further includes a reporting module connected to the acquisition module 52. The reporting module reports at least one of following capability information about the first terminal, the service type of the first service, or the protocol version information about the first service to the base station.

It should be noted that the capability information about the first terminal includes at least one of: whether the first terminal supports the quadrature amplitude modulation 64 QAM, whether the first terminal supports the transmit diversity, whether the first terminal supports the PC5 data duplication, whether the first terminal supports the PC5 data split, or information about a transmission format supported by the first terminal.

It should be noted that the reporting module is further configured to report at least one of the service type of the first service or the protocol version information about the first service to the base station in at least one of following manners: carrying the service type of the first service and/or the protocol version information about the first service through user equipment assistance information, carrying the service type of the first service and/or the protocol version information about the first service through sidelink user equipment information, carrying the service type of the first service and/or the protocol version information about the first service through a sidelink buffer size report, or carrying the service type of the first service and/or the protocol version information about the first service through a defined media access control control element (MAC CE) on a sidelink.

It should be noted that the MAC CE may be, but not necessarily, different from an MAC CE in the existing art, or be an extended MAC CE based on the MAC CE in the existing art, or be a newly defined MAC CE.

In an embodiment of the present disclosure, the device further includes an indication module connected to the determination module 54. The indication module is configured to indicate protocol version information or transmission format information about a transmitted service in transmitted sidelink control information. The protocol version information or the transmission format information is placed at $1^{st}$ bit to $N^{th}$ bit of the sidelink control information or a reserved bit of the sidelink control information, where N is an integer greater than or equal to 1.

In an embodiment of the present disclosure, the acquisition module 52 may acquire the capability information about the second terminal of the proximity service in at least one of following manners: receiving the capability information about the second terminal sent by the second terminal through first sidelink broadcast signaling, receiving the capability information about the second terminal sent by the second terminal through first sidelink unicast signaling, or receiving the capability information about the second terminal sent by the second terminal through a defined MAC CE on a sidelink.

It should be noted that, the device further includes a transmitting module. The transmitting module is configured to transmit a request message configured to request the capability information about the second terminal to the second terminal through second sidelink broadcast signaling, or transmit the request message configured to request the capability information about the second terminal to the second terminal through second sidelink unicast signaling.

It should be noted that the step of receiving the capability information about the second terminal may be represented by receiving the capability information about the second terminal through sidelink broadcast signaling or sidelink unicast signaling, but it is not limited thereto.

Optionally, the device may, but not necessarily, be performed by the terminal shown in FIG. 2, or by the first terminal in this embodiment.

It should be noted that preceding each module may be implemented by software or hardware. Implementations by hardware may be, but not necessarily, performed in following manners: the preceding various modules are located in a same processor, or the preceding various modules are located in their respective processors in any combination form.

Embodiment Three

An embodiment of the present disclosure further provides a data duplication mode.

Figure 6:
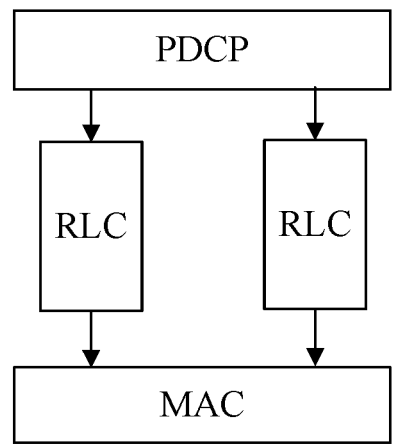
FIG. 6 is a receiving schematic view of data duplication through a carrier aggregation according to an embodiment of the present disclosure.
Figure 7:
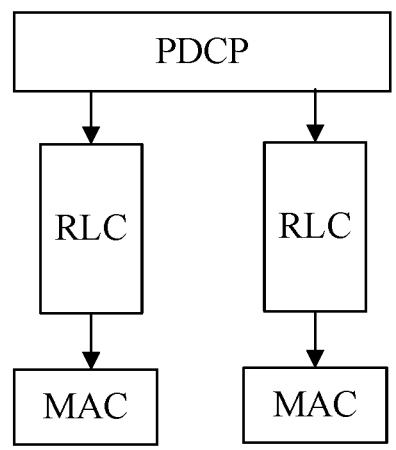
FIG. 7 is a receiving schematic view of data duplication through a dual connectivity according to an embodiment of the present disclosure.

It should be noted that the data duplication is a method that may satisfy service requirements of high reliability and low latency. There are mainly two types of the data duplication based on a packet data convergence protocol (PDCP) layer: data duplication implementing through a carrier aggregation (CA) as shown in FIG. 6, and data duplication implementing through a dual connectivity (DC) as shown in FIG. 7. In the dual connectivity architecture, a PDCP protocol data unit (PDU) is transmitted through two radio link control (RLC) entities after duplicating data. The two RLC entities correspond to MAC entities on different base stations respectively. In the carrier aggregation architecture, a PDCP PDU transmits data through two RLC entities after duplicating data, which are scheduled by a same MAC entity, the two RLC entities correspond to two logical channels respectively, and the two logical channels are mapped to different carriers for a transmission.

Figure 8A:
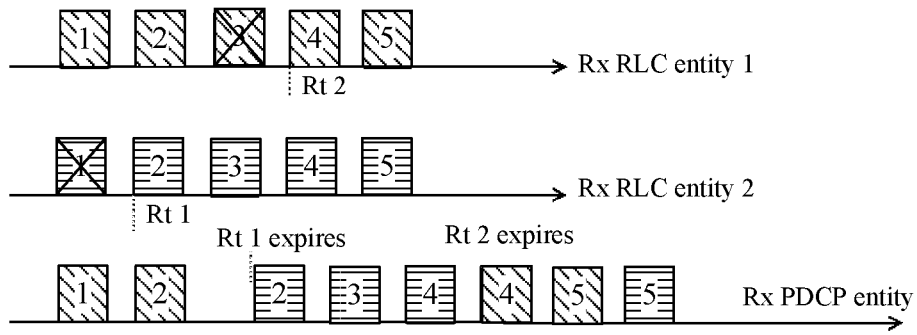
FIG. 8(a) is a schematic view of UM RLC entity reordering according to an embodiment of the present disclosure.
Figure 8B:
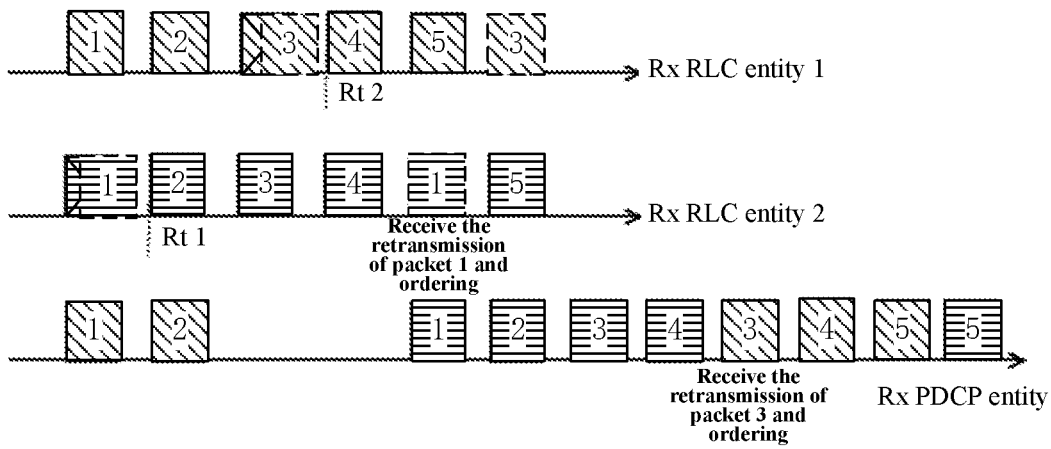
FIG. 8(b) is a schematic view of AM RLC entity reordering according to an embodiment of the present disclosure.

In LTE, an RLC performs reordering and submits multiple RLC service data units (SDUs) to the PDCP layer in sequence. For a wireless bearer configured for the data duplication transmission, two RLC entities associated with a PDCP entity of this bearer are independent from each other. At a receiving end, the two RLC entities separately perform reordering and submit RLC SDUs to the PDCP entity in sequence. The PDCP entity receives data from the two associated RLC entities, and performs reordering, duplicate packet detection and discarding. Thus, data transmission latency is greatly increased since the reordering is performed by both RLC and PDCP layers. Taking an unacknowledge mode (UM) RLC entity as an example, as shown in FIG. 8a, only when a reordering timer corresponding to packet 1 expires and packet 1 is confirmed lost, that RLC entity 2 may continue to submit data packets to an upper layer in sequence. Similarly, only when a reordering timer associated with packet 3 expires and packet 3 is confirmed lost, that RLC entity 1 may continue to submit data packets to an upper layer in sequence. After receiving data submitted by the two associated RLC entities, the PDCP entity performs reordering, duplicate packet detection and discarding, and submits the data to an upper layer in sequence. However, for an acknowledge mode (AM) RLC entity, as shown in FIG. 8b, a retransmission of an automatic repeat request (ARQ) and reordering of the RLC layer make the delay problem more serious. When a reordering timer corresponding to packet 1 or packet 3 expires, the retransmission of the ARQ is further triggered. Packets are stopped from being submitted to the upper layer in sequence until packet 1 or packet 3 is received or a maximum number of the retransmission is reached and packet 1 or packet 3 is confirmed lost.

In the case of the data duplication, it is possible to solve the double delay problem caused by the reordering of the RLC layer and the reordering of the PDCP layer at the receiving end through optimization methods described below.

A PDCP entity receives a data packet transmitted by an RLC entity associated with the PDCP entity, and the PDCP entity transmits notification information to the RLC entity, where the notification information is configured to indicate a data packet currently received in sequence by the PDCP entity or a next data packet to be received in sequence by the PDCP entity. The data packet currently received in sequence by the PDCP entity or the next data packet to be received in sequence by the PDCP entity is feedback to the RLC entity by the PDCP entity, so that the RLC entity may discard, or no longer wait for a retransmission, or no longer wait for an associated reordering timer to expire, or no longer transmit data packets that have been transmitted by other associated RLC entities, or no longer transmit data packets, receipt of which has been acknowledged by the PDCP entity. Thereby, the above-mentioned double delay problem is alleviated.

Alternatively, the RLC entity transmits a data packet to the PDCP entity associated with the RLC entity.

The RLC entity receives notification information transmitted by the RLC entity, where the notification information is configured to indicate the data packet currently received in sequence by the PDCP entity or the next data packet to be received in sequence by the PDCP entity.

The RLC entity discards or does not transmit data packets, sequential receipt of which has been acknowledged by the PDCP entity.

It should be noted that the notification information carries a first index value or a second index value, where the first index value includes a first sequence number of a data packet currently received in sequence by the PDCP entity, and the second index value includes a second sequence number of a next data packet to be received in sequence by the PDCP entity.

It should be noted that the data packets, sequential receipt of which has been acknowledged, may include a data packet with a latest sequence number among packets which are currently received and ordered in sequence, or include a data packet with a sequence number next to the latest sequence number among the packets which are currently received and ordered in sequence; the data packets, receipt of which has been acknowledged, may further include data packets with a sequence number less than or equal to the first sequence number, or data packets with a sequence number less than the second sequence number, which are not limited thereto.

It should be noted that the data packet may be, but not limited to, a PDCP PDU.

It should be noted that the sequence number of the data packet may be, but not limited to, a PDCP PDU sequence number (PDCP SN).

The present disclosure further provides an alternative embodiment. In this alternative embodiment, an inter-layer interaction between the PDCP layer and the RLC layer is increased, so that a receiving PDCP entity informs an associated RLC entity of PDCP PDUs received in sequence, the RLC entity discards PDCP PDUs, receipt of which has been acknowledged by the PDCP layer, or the RLC entity no longer submits the PDCP PDUs, receipt of which has been acknowledged by the PDCP layer, to the PDCP entity. Specifically, the process includes steps described below.

In step 1, the receiving PDCP entity receives data packets submitted by associated RLC entities, and performs reordering, duplicate packet detection and discarding.

In step 2, the receiving PDCP entity informs the associated RLC entities of a latest PDCP PDU currently received in sequence or a next PDCP PDU to be received in sequence. Specifically, there are multiple implementation manners described below.

1) The PDCP entity provides each associated RLC entity with a maintenance entity respectively and thus the PDCP entity knows data packets submitted by each RLC entity. If the latest data packet currently received in sequence by the PDCP entity (assuming that the latest PDCP PDU has a packet sequence number of PDCP SN1) is from RLC entity 1 (that is, this data packet is submitted to the PDCP entity by RLC entity 1), then the PDCP entity informs RLC entity 2 that the PDCP PDU with the packet sequence number of PDCP SN1 has been received, or informs RLC entity 2 of the packet sequence number PDCP SN of a next PDCP PDU to be received in sequence by the PDCP entity.

2) When the PDCP entity orders each data packet, or orders N (where N is an integer greater than or equal to 1) data packets in each sequence, or periodically (each time a period timer expires) notifies the associated RLC entities of the packet sequence number PDCP SN of the latest PDCP PDU currently received in sequence or the packet sequence number PDCP SN of the next PDCP PDU to be received in sequence, then among these data packets, receipt of which has been acknowledged by the PDCP entity, the RLC entity knows which data packets have been submitted by itself and which data packets have not been submitted by itself.

3) The PDCP entity maintains a timer, which is started or restarted each time when a PDCP PDU is ordered. When the timer expires, the PDCP entity is triggered to inform the associated RLC entities of the packet sequence number PDCP SN of the latest PDCP PDU currently received in sequence or the packet sequence number PDCP SN of the next PDCP PDU to be received in sequence.

4) When a non-sequential PDCP PDU is received, a PDCP reordering timer is triggered and started, and the PDCP entity is triggered to inform the associated RLC entities of the packet sequence number PDCP SN of the latest PDCP PDU currently received in sequence or the packet number PDCP SN of the next PDCP PDU to be received in sequence.

It should be noted that the preceding implementation manners may exist independently or coexist in multiple ways. Which implementation manner takes the priority to satisfy the corresponding condition will be used.

In step 3, the RLC entities receive from the PDCP entity about the latest PDCP PDU currently received in sequence, and the RLC entities no longer submit PDCP PDUs, receipt of which has been acknowledged by the PDCP entity, to the PDCP entity. Specifically, the step may include manners described below.

1) If RLC entity 2 receives a notified packet sequence number (e.g., PDCP SN1) of the PDCP PDU that has been received by the PDCP entity from the PDCP entity, then RLC entity 2 no longer submits a PDCP PDU/RLC SDU with a packet sequence number less than or equal to PDCP SN1 to the PDCP entity. If RLC entity 2 is waiting for a RLC reordering timer associated with this data packet to expire (to acknowledge the packet loss), or is waiting for the retransmission of this data packet, then the RLC entity may immediately regard without waiting for the reordering timer to expire or for the retransmission that the data packet is already lost. If RLC entity 2 has cached the data packet but has not yet submitted the data packet to the PDCP entity, then RLC entity 2 no longer submits the data packet to the PDCP entity and may discard the data packet. Further, if RLC entity 2 caches at least one data packet with a packet sequence number greater than that of the packet, receipt of which has been currently acknowledged by the PDCP entity, then the RLC entity 2 submits the cached data packet to the PDCP entity in sequence.

2) When the RLC entities receive from the PDCP entity the notified packet sequence number of the PDCP PDU currently received in sequence by the PDCP entity, or the notified packet sequence number of the next PDCP PDU to be received in sequence, and if the RLC entity has already submitted the PDCP PDU, which is currently received by the RLC entity in sequence, to the PDCP entity, then the RLC entity ignores this notification without additional operation.

For example, as shown in FIGS. 8(*a*) and 8(*b*), at the receiving end, RLC entity 1 submits packet 1 and packet 2 to the PDCP entity in sequence, then waits for packet 3. RLC entity 1 may have received packet 4 or 5 subsequently, but it is still waiting for packet 3 (waiting for an RLC reordering timer associated with the packet 3 to expire, or waiting for the transmitting end to retransmit packet 3). RLC entity 2 has not received packet 1, but has received packet 2, 3 or 4, and it is still waiting for an RLC reordering timer associated with packet 1 to expire, or waiting for the transmitting end to retransmit packet 1. A receiving PDCP entity receives packet 1 and packet 2 from RLC entity 1, and the PDCP entity notifies RLC entity 2 that packet 2 has been currently received in sequence (or that packet 3 is the next packet to be received in sequence). After receiving the notification of the PDCP entity, RLC entity 2 regards that packet 1 is lost (no longer waits for the associated reordering timer to expire or for the retransmission), and RLC entity 2 does not need to submit packet 2 to the PDCP entity again. Then, RLC entity 2 submits cached packet 3 and packet 4 to the PDCP entity in sequence. The PDCP entity receives packet 3 and packet 4 from RLC entity 2 and then notifies RLC entity 1 that packet 4 has been currently received in sequence (or that packet 5 is the next packet to be received in sequence). After receiving the notification of the PDCP entity, RLC entity 1 regards that packet 3 is lost and packet 4 does not need to be submitted to the PDCP entity again, and so on.

For example, as shown in FIGS. 8(*a*) and 8(*b*), at the receiving end, the PDCP entity maintains a sequential receipt timer timer 1. Timer 1 starts when the PDCP entity receives packet 1 from any RLC entity, and timer 1 stops and restarts when the PDCP entity receives packet 2 from any RLC entity. If the PDCP entity does not receive packet 3 when timer 1 expires, then the PDCP entity notifies the associated RLC entities that packet 2 has been currently received in sequence (or that packet 3 is a next packet to be received in sequence). If both packet 1 and packet 2 are submitted to the PDCP entity by the RLC 1, while RLC 2 has received packets 2, 3 and 4, but it is still waiting for the reordering timer associated with packet 1 to expire or for the retransmission of packet 1, then when RLC 2 receives the notification of the PDCP entity that packet 2 has been currently received in sequence (or that the packet 3 is the next packet to be received in sequence), RLC 2 regards that packet 1 is lost, no longer waits for the reordering timer associated with packet 1 to expire or for the retransmission of packet 1, and packet 2 does not need to be submitted to the PDCP entity again, meanwhile, cached packet 3 and packet 4 may be submitted to the PDCP entity.

Figure 9:
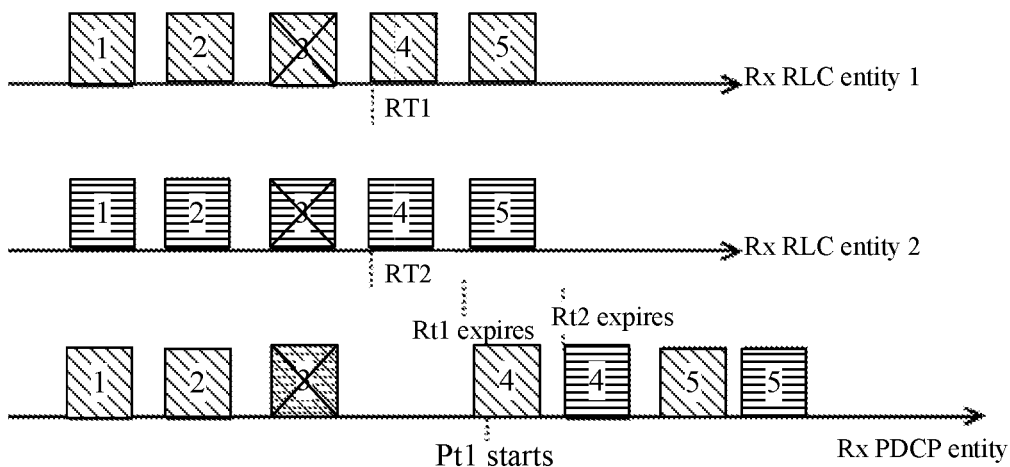
FIG. 9 is a schematic view of PDCP reordering according to an embodiment of the present disclosure.

For example, as regards the PDCP reordering timer, as shown in FIG. 9, it is assumed that both packet 3 of RLC 1 and packet 3 of RLC 2 trigger an RLC reordering timer, (RLC 1 and RLC 2 receive packet 4 respectively). When a reordering timer Rt1 of RLC 1 expires, RLC 1 regards that packet 3 is lost and submits packet 4 to the PDCP entity, and the PDCP layer triggers a reordering timer Pt1 about packet 3. When a reordering timer Rt2 of RLC 2 expires, RLC 2 regards that packet 3 is lost and submits packet 4 to the PDCP entity. At this time, the PDCP entity receives both packet 3 from the RLC 1 and packet 3 from the RLC 2, then the PDCP entity may confirm without waiting for the PDCP reordering timer to expire that packet 3 is lost (since RLC entity 1 has confirms that packet 3 is lost and RLC entity 2 has also confirms that packet 3 is lost). Moreover, the PDCP reordering timer associated with packet 3 is stopped.

Embodiment Four

An embodiment of the present disclosure further provides a storage medium. The storage medium is configured to store a computer program. When executed, the computer program is configured to implement the steps of any one of the method embodiments described above.

Optionally, in this embodiment, the storage medium may include, but is not limited to, a U disk, a read-only memory (ROM), a random access memory (RAM), a mobile hard disk, a magnetic disk, an optical disk or another medium capable of storing computer programs.

An embodiment of the present disclosure further provides an electronic device. The electronic device includes a memory and a processor. The memory is configured to store a computer program. The processor is configured to execute the computer program to perform the steps of any one of the method embodiments described above.

Optionally, the electronic device may further include a transmission device and an input-output device. Both the transmission device and the input-output device are connected to the processor.

Optionally, for specific examples in this embodiment, refer to the examples described in the embodiments and optional implementation modes described above, which are not repeated in this embodiment.

Apparently, it is to be understood by those skilled in the art that each of the modules or the steps of the present disclosure described above may be implemented by a general-purpose computing apparatus, and the modules or steps may be concentrated on a single computing apparatus or distributed on a network composed of multiple computing apparatuses. Optionally, the modules or steps may be implemented by program codes executable by the computing apparatus, so that the modules or steps may be stored in a storage apparatus and executed by the computing apparatus. In some circumstances, the modules or steps may be performed in sequences different from those described herein, or be made into various integrated circuit modules separately, or multiple modules or steps therein may be made into a single integrated circuit module for implementation. In this way, the present disclosure is not limited to any specific combination of hardware and software.

The above are only alternative embodiments of the present disclosure and are not intended to limit the present disclosure. It is easy for those skilled in the art to conceive modifications or substitutions within the technical scope of the present disclosure. Any modification, substitution, improvement and the like made within the principle of the present disclosure are within the protection scope of the present disclosure.

What is claimed is:

1. A wireless communication method, comprising:
   acquiring, by a terminal, information comprising service profile information about a first service from an upper layer of the terminal, and transmission parameter information configured for the terminal by a base station, wherein the service profile information about the first service comprises protocol version information about the first service and transmission format information about the first service, and wherein the transmission parameter information is configured by the base station based on the protocol version information and the protocol version information is identified by the base station based on a preconfigured mapping relation between a communication destination and the protocol version information; and
   determining, by the terminal, a transmission mode according to the acquired information.

2. The method of claim 1, wherein the first service includes a vehicle-to-everything (V2X) communication.

3. The method of claim 1, wherein acquiring information comprises receiving indication information delivered by the upper layer of the terminal, wherein the indication information carries the service profile information about the first service.

4. The method of claim 3, further comprising:
   acquiring, by the terminal, a mapping relation between a service type of a service and serviceprofile information about the service; and
   determining, by the terminal, the service profile information about the first service according to a service type of the first service and the mapping relation.

5. The method of claim 3, wherein the transmission mode comprises: a transmission format of transmitting the first service and a modulation and coding scheme used for transmitting the first service.

6. The method of claim 3, further comprising reporting, by the terminal to the base station, capability information about the terminal.

7. The method of claim 6, wherein the capability information comprises: whether the terminal supports quadrature amplitude modulation (64QAM) and whether the terminal supports transmit diversity.

8. A wireless communication method, comprising:
   receiving, by a base station, a sidelinkUEinformation message;
   identifying, by the base station, a preconfigured mapping relation between a communication destination and protocol version information, wherein the communication destination is indicated in the sidelinkUEinformation message; and
   obtaining, by the base station, the corresponding protocol version information according to the mapping relation and the communication destination.

9. The method of claim 8, wherein the communication destination includes a vehicle-to-everything (V2X) communication destination.

10. A wireless communication device, comprising a memory and a processor, wherein the memory stores a computer program, and the processor is configured to execute the computer program to:
    acquire information comprising service profile information about a first service from an upper layer of the wireless communication device and transmission parameter information configured for the wireless communication device by a base station, wherein the service profile information about the first service comprises protocol version information about the first service and transmission format information about the first service, and wherein the transmission parameter information is configured by the base station based on the protocol version information and the protocol version information is identified by the base station based on a preconfigured mapping relation between a communication destination and the protocol version information; and
    determine a transmission mode according to the acquired information.

11. The wireless communication device of claim 10, wherein the first service includes a vehicle-to-everything (V2X) communication.

12. The wireless communication device of claim 10, wherein in acquiring the information the processor is configured to receive indication information delivered by the upper layer of the wireless communication device, wherein the indication information carries the service profile information about the first service.

13. The wireless communication device of claim 12, wherein the processor is further configured to:
    acquire a mapping relation between a service type of a service and service profile information about the service; and
    determine the service profile information about the first service according to a service type of the first service and the mapping relation.

14. The wireless communication device of claim 12, wherein the transmission mode comprises a transmission format of transmitting the first service and a modulation and coding scheme used for transmitting the first service.

15. The wireless communication device of claim 12, wherein the processor is further configured to report, to the base station, capability information about the wireless communication device.

16. The wireless communication device of claim 15, wherein the capability information comprises whether the wireless communication device supports quadrature amplitude modulation (64QAM) and whether the wireless communication device supports transmit diversity.

17. A wireless communication device, comprising a memory and a processor, wherein the memory stores a computer program, and the processor is configured to execute the computer program to:
- receive a sidelinkUEinformation message;
- identify a preconfigured mapping relation between a communication destination and protocol version information, wherein the communication destination is indicated in the sidelinkUEinformation message; and
- obtain the corresponding protocol version information according to the mapping relation and the communication destination.

18. The wireless communication device of claim 17, wherein the communication destination includes a vehicle-to-everything (V2X) communication destination.

* * * * *